No. 775,101. PATENTED NOV. 15, 1904.
W. E. DOBBINS.
PHOTOGRAPHIC PRINTING FRAME.
APPLICATION FILED DEC. 28, 1903.
NO MODEL.
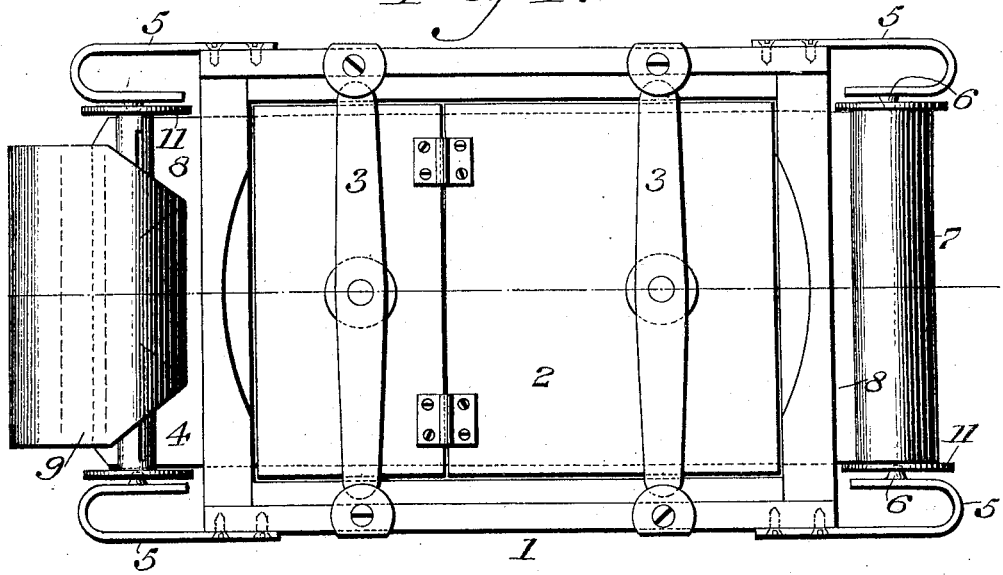
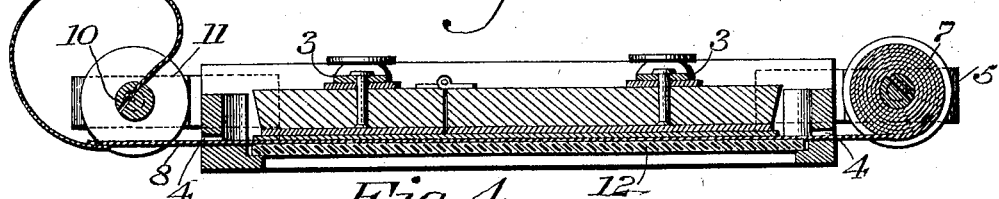
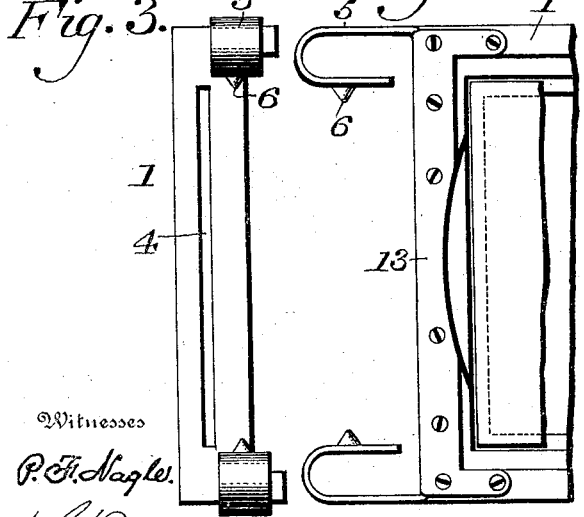

No. 775,101. Patented November 15, 1904.

UNITED STATES PATENT OFFICE.

WILLIAM E. DOBBINS, OF ASHBOURNE, PENNSYLVANIA.

PHOTOGRAPHIC-PRINTING FRAME.

SPECIFICATION forming part of Letters Patent No. 775,101, dated November 15, 1904.

Application filed December 28, 1903. Serial No. 186,774. (No model.)

*To all whom it may concern:*

Be it known that I, WILLIAM E. DOBBINS, a citizen of the United States, residing at Ashbourne, county of Montgomery, State of Pennsylvania, have invented a new and useful Improvement in Photographic-Printing Frames, of which the following specification.

My invention relates to photographic-printing frames.

It consists of means for enabling prints to be taken of portions of a film without cutting the same.

It further consists of other novel features of construction, all as will be hereinafter fully set forth.

Figure 1 represents a top plan view of a photographic frame embodying my invention. Fig. 2 represents a section through the line $xx$, Fig. 1. Fig. 3 represents an end view of the device shown in Fig. 1. Fig. 4 is a fragmentary top plan view showing a modification of my advice.

Similar numerals of reference indicate corresponding parts in the figures.

Referring to the drawings, 1 designates a printing-frame provided with the usual back 2 and clamping devices 3. Through the ends of the frame are cut slots 4 4. Secured to the ends of the frame are C-shaped springs 5, on the inner ends of which are lugs 6. Sprung between the lugs 6 6 at one end of the frame 1 is a spool 7, containing a film 8. At the free end of the film 8 is attached a tag or label 9, the end of which is slipped into a slot 10 in the spindle of a second spool 11 at the other end of the frame 1. It is clear that the film after developing is rewound upon the spool 7, which is engaged between the lugs 6 6, as shown, and passed through the slot 4 and over the glass 12. The end of the label-tag 9 is then engaged in the slot 10 of the second spool 11, and the film is wound off the spool 7 onto the spool 11 step by step as the pictures are successively printed therefrom.

In the form of the device shown in Fig. 4 the brackets or springs 5 and bearing-lugs 6 are shown as forming part of the plate 13, which serves besides to strengthen the frame 1.

It is evident that various changes may be made by those skilled in the art which will come within the scope of my invention, and I do not, therefore, desire to be limited in every instance to the exact construction herein shown and described. Thus instead of the slots 4 shown it is clear that the ends of the frame may be cut away, so as to permit the strip or film or other negative to pass directly over the glass.

The particular advantage of my invention lies in the fact that by unreeling the film directly from the spool without cutting it to pieces it is unnecessary to soak it in glycerin or take any other means to prevent its curling. In the case of continuous picture-films it is of great advantage.

By means of the spring connection, which forms the essence of my invention, the spools may be readily connected with or detached from a frame, while at the same time they are held by the resilience of the springs with sufficient friction to prevent their turning except by the hand of the operator.

Having thus described my invention, what I claim as new, and desire to secure by Letters Patent, is—

1. A printing-frame the ends of which are slotted to pass a strip of film, and a pair of spring-lugs secured at each end of said frame and adapted to detachably and resiliently engage a film-holding spool.

2. A printing-frame the ends of which are slotted to pass a strip of film, U-shaped spring-brackets at the ends of said frame and lugs at the free ends of said brackets adapted to detachably and resiliently engage in recesses in the ends of a film-holding spool.

WILLIAM E. DOBBINS.

Witnesses:
JOHN A. WIEDERSHEIM,
GEO. L. COOPER.